J. C. SMITH.
RECTIFYING APPARATUS.
No. 176,896.            Patented May 2, 1876.
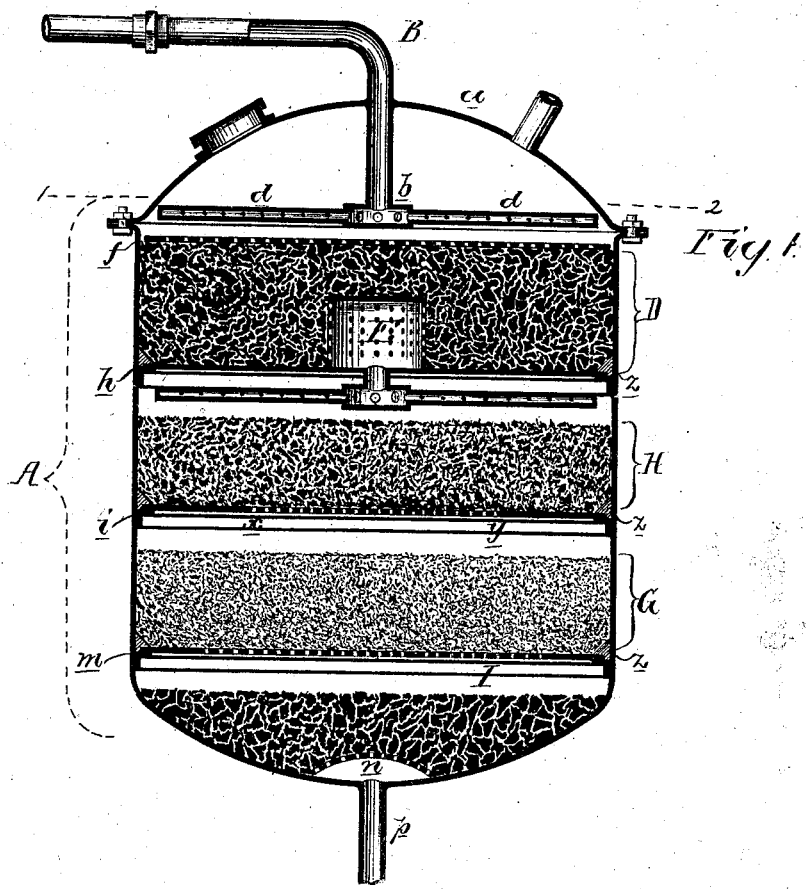
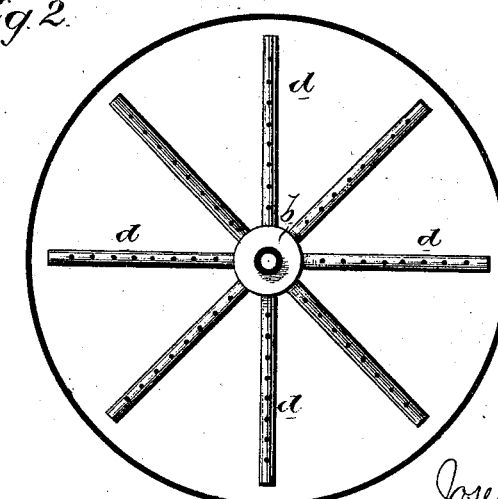
Witnesses,
Thomas McIlvain
Harry Smith
Joseph C. Smith,
by his Attorneys
Howson Hon

UNITED STATES PATENT OFFICE.

JOSEPH C. SMITH, OF PHILADELPHIA, PA., ASSIGNOR OF ONE-HALF HIS RIGHT TO GEORGE W. MIDDLETON, OF SAME PLACE.

IMPROVEMENT IN RECTIFYING APPARATUS.

Specification forming part of Letters Patent No. 176,896, dated May 2, 1876; application filed December 4, 1875.

*To all whom it may concern:*

Be it known that I, JOSEPH C. SMITH, of Philadelphia, Pennsylvania, have invented an Improved Rectifying Apparatus, of which the following is a specification:

The object of my invention is a saving of time and the economy of filtering material in the rectifying of spirits. This object I attain in the manner which I will now proceed to describe, reference being had to the accompanying drawing, in which—

Figure 1 is a vertical section of the rectifying apparatus, and Fig. 2 a sectional plan on the line 1 2.

The outer cylindrical casing A of the rectifying apparatus is surmounted by a removable cover, $a$, through the center of which passes a pipe, B, communicating with an elevated reservoir containing the crude spirit, or with a pump, and terminating in a central chamber, $b$, from which radiate a number of perforated tubes, $d$, closed at their outer end, so that the spirit will pass, in a number of small streams, over the entire surface of a perforated plate, $f$, which rests on a mass of charcoal, D, supported on a diaphragm, $h$, which rests on ledges or brackets in the interior of the casing. The spirit, after percolating through this mass of charcoal, must pass through the perforated walls of a central chamber, E, on the above-mentioned diaphragm $h$, and thence into a series of radial tubes similar to those above referred to, and in small widely-disseminated streams from these tubes onto a mass, H, of charcoal, supported by a partially-perforated diaphragm, $i$, which also rests on a ledge or bracket in the casing. The perforated portion of this diaphragm is limited to the central portion of the same, extending from $x$ to $y$, the remaining or outer annular portion of the diaphragm being closed, so that the spirit, in percolating through the second mass of charcoal, will be directed to the central perforated portion of the diaphragm, and avoids the lower corner of the mass of charcoal, where it might otherwise be lodged and retained longer than desirable.

The spirit, passing through the perforations of the diaphragm $i$, falls onto a third mass of charcoal, G, supported by a perforated diaphragm, $m$, an outer annular portion of the latter being also free from perforations, for the reasons mentioned above.

The spirit passes through the perforations of the diaphragm $m$ into the lowest chamber I of the casing, and thence, through a perforated or wire-gauze plate $n$, into the discharge-pipe $p$, which it leaves in the desired rectified condition.

Around the edge of each of the diaphragms $h$, $i$, and $m$ may be placed a layer, $z$, of plaster-of-paris or other equivalent material, which will prevent the passage of any of the liquor around the said edges, and thereby prevent the escape from the apparatus of any liquor which has not been thoroughly rectified.

It should be understood that the highest mass of granulated charcoal is comparatively coarse, the next below somewhat finer, and the lowest mass still finer, a plan which insures the lasting of the entire masses of charcoal for a much longer time in proportion to the quantity of spirits rectified than when one mass only of charcoal is employed.

I wish it to be understood that I do not desire to claim, in this application, the diaphragm $h$ having a central perforated casing surrounding a chamber communicating with distributing-arms below the diaphragm, as this forms the subject of a separate application made by me; but

I claim as my invention—

1. The within-described spirit-rectifying apparatus, consisting of a casing inclosing successive and entirely separated layers of granulated filtering material of various degrees of fineness, and with open spaces between each layer, in combination with means, substantially as described, for spreading the liquid into minute streams.

2. The combination, in a casing, A, of the supply-pipe B and its stationary radial perforated arms with the perforated plate $f$ and the underlying mass D of charcoal.

3. The centrally-perforated diaphragm $i$, having an imperforate annulus supporting the mass H of charcoal within the casing A, in combination with the lower centrally-perforated diaphragm, having an imperforate annulus supporting another layer of charcoal above the outlet-chamber, as specified.

4. The combination of the imperforate diaphragm $h$, having a central opening, the diaphragm $i$, having an imperforate annulus, with the diaphragm $m$, having a narrower imperforate annulus, making complete separate chambers within the casing A, substantially as and for the purposes herein set forth.

In testimony whereof I have signed my name to this specification in the presence of two subscribing witnesses.

JOSEPH C. SMITH.

Witnesses:
HARRY HOWSON, Jr.,
HARRY SMITH.